United States Patent
Provine et al.

(10) Patent No.: US 9,116,996 B1
(45) Date of Patent: Aug. 25, 2015

(54) REVERSE QUESTION ANSWERING

(75) Inventors: John R. Provine, New York, NY (US); Abhijit A. Mahabal, Jersey City, NJ (US); John J. Lee, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 32 days.

(21) Appl. No.: 13/557,147

(22) Filed: Jul. 24, 2012

Related U.S. Application Data

(60) Provisional application No. 61/511,511, filed on Jul. 25, 2011.

(51) Int. Cl.
*G06F 17/30* (2006.01)

(52) U.S. Cl.
CPC ................................. *G06F 17/30867* (2013.01)

(58) Field of Classification Search
CPC .................................................. G06F 17/30867
USPC ........ 704/7, 8, 9, 10, 251, 252; 707/731, 706, 707/962, 999.003, 999.004, 999.005, 707/999.006, 999.102, E17.118; 706/48, 50
See application file for complete search history.

(56) References Cited

U.S. PATENT DOCUMENTS

| | | | | |
|---|---|---|---|---|
| 7,487,144 | B2 * | 2/2009 | Shakib et al. | 707/999.003 |
| 7,567,976 | B1 | 7/2009 | Betz et al. | |
| 7,587,387 | B2 | 9/2009 | Hogue | |
| 7,769,579 | B2 | 8/2010 | Zhao et al. | |
| 7,996,393 | B1 * | 8/2011 | Nanno et al. | 707/723 |
| 8,065,290 | B2 | 11/2011 | Hogue | |
| 8,370,319 | B1 * | 2/2013 | Krynski et al. | 707/706 |
| 2004/0024752 | A1 * | 2/2004 | Manber et al. | 707/3 |
| 2005/0114327 | A1 * | 5/2005 | Kumamoto et al. | 707/3 |
| 2005/0262058 | A1 * | 11/2005 | Chandrasekar et al. | 707/3 |
| 2010/0131563 | A1 * | 5/2010 | Yin | 707/794 |
| 2010/0241631 | A1 * | 9/2010 | Williams | 707/741 |
| 2010/0250582 | A1 * | 9/2010 | Anderson | 707/769 |
| 2010/0293174 | A1 * | 11/2010 | Bennett et al. | 707/759 |
| 2010/0318538 | A1 * | 12/2010 | Wyman et al. | 707/759 |

OTHER PUBLICATIONS

Adam Berger et al., "Bridging the Lexical Chasm: Statistical Approaches to Answer-Finding", ACM SIGIR 2000, pp. 192-199.*
Eugene Agichtein et al., "Learning Search Engine Specific Query Transformations for Question Answering", ACM WWW10, May 1-5, 2001, pp. 169-178.*
Dragomir Radev et al., "Probabilistic Question Answering on the Web", 2005, Journal of the American Society for Information Science and Technology, 56(6), pp. 571-583.*

* cited by examiner

*Primary Examiner* — Scott A Waldron
(74) *Attorney, Agent, or Firm* — Fish & Richardson P.C.

(57) ABSTRACT

Methods, systems, and apparatus, including computer programs encoded on a computer storage medium, for associating each of a plurality of different terms to documents that contain the term to create first associations; associating each of the associated documents to one or more queries to create second associations, wherein search results for each of the queries include a reference to the associated document; determining a particular query and a particular term are associated with a same document based on the first and second associations; in response to the determination, creating a mapping between the particular query and the particular term when both are associated with the same document; and selecting a respective answer from a plurality of mapped terms for each the mapped queries, wherein the respective answer is selected based on a count the respective answer occurs in documents contained in search results for the mapped queries.

18 Claims, 5 Drawing Sheets

REVERSE QUESTION ANSWERING

CROSS-REFERENCE TO RELATED APPLICATIONS

This application claims the benefit under 35 U.S.C. §119(e) of U.S. Provisional Application Ser. No. 61/511,511, filed on Jul. 25, 2011 entitled "REVERSE QUESTION ANSWERING," the entirety of which is hereby incorporated by reference.

BACKGROUND

This specification relates to digital data processing and, in particular, to determining answers for questions.

Internet search engines provide information about Internet accessible resources (e.g., Web pages, images, sounds, text documents, multimedia content, and other content) that are responsive to a user's search query by returning a set of search results in response to the query. A search result includes, for example, a Uniform Resource Locator (URL) and a snippet of information for resources responsive to a query.

SUMMARY

Users can submit queries to a search engine seeking answers within a given category. In response, the search engine returns information relevant to the queries in a manner to reduce an amount of time the user sifts through individual search results to determine the information being sought.

In various implementations, answers can be provided in response to queries directed to particular categories by mapping the queries to corresponding answers using search engine ranking information. The mapping of such queries to answers can be performed in a reverse manner, where the matching process begins by identifying possible answers, and uses search engine ranking information to match the answers to their corresponding queries. This mapping can be used to determine answers that best correspond to submitted queries.

In general, one aspect of the subject matter described in the specification can be embodied in methods that include the actions of associating each of a plurality of different terms to one or more documents that contain the term to create first associations; associating each of the associated documents to one or more queries to create second associations, wherein search results for each of the queries include a reference to the associated document; determining a particular query and a particular term are associated with a same document based on the first and second associations; in response to the determination, creating a mapping between the particular query and the particular term when both are associated with the same document; and selecting a respective answer from a plurality of mapped terms for each of one or more mapped queries, wherein the respective answer is selected based on a count the respective answer occurs in documents contained in search results for the one or more mapped queries. Other embodiments of this aspect include corresponding systems, apparatus, and computer programs.

These and other aspects can optionally include one or more of the following features. The terms do not contain duplicate terms, and where the terms are selected based on a count the term occurs in the one or more documents. The search results for the one or more queries are ordered and include the associated documents within a specified range of the ordering. The one or more queries are related to a category. The mapping between a particular query and a particular term is based at least in part on a number of documents containing the term. The associating each of the associated documents to one or more queries is based at least in part on a ranking of the associated documents in search results for the one or more queries. The associating each of the associated documents to one or more queries comprises using search engine query logs to identify queries based at least in part on a count the term occurs within documents referenced in the search results for the queries. The answer is provided with one or more search results responsive to the query.

Particular embodiments of the subject matter described in this specification can be implemented so as to realize one or more of the following advantages. Question answering for a given category of answers is simplified by using search engine search result rankings to match answers to queries. An answer to a query can be determined without reliance on additional parsing beyond that performed by a search engine. For example, each of the following queries can be answered without further parsing: "mount everest height", "how tall is mount everest," "elevation of mount everest," and "elevation of everest." The time needed to map queries to answers can be reduced since search engine ranking information is used to determine answers. The process of reverse mapping answers to queries can be used to determine answers to queries in an efficient manner, since the space of possible answers is typically less than the space of possible queries. For example, in general, there is only one correct answer for the height of Mount Everest, yet there a number of different ways of phrasing queries seeking that answer (e.g., "mount everest height," "how tall is mount everest," "elevation of mount everest," and "elevation of everest"). Further, the process of reverse mapping can also increase accuracy by increasing a number of possible answers identified and subsequently mapping those answers to appropriate queries, thereby accounting for an increased number of available answers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
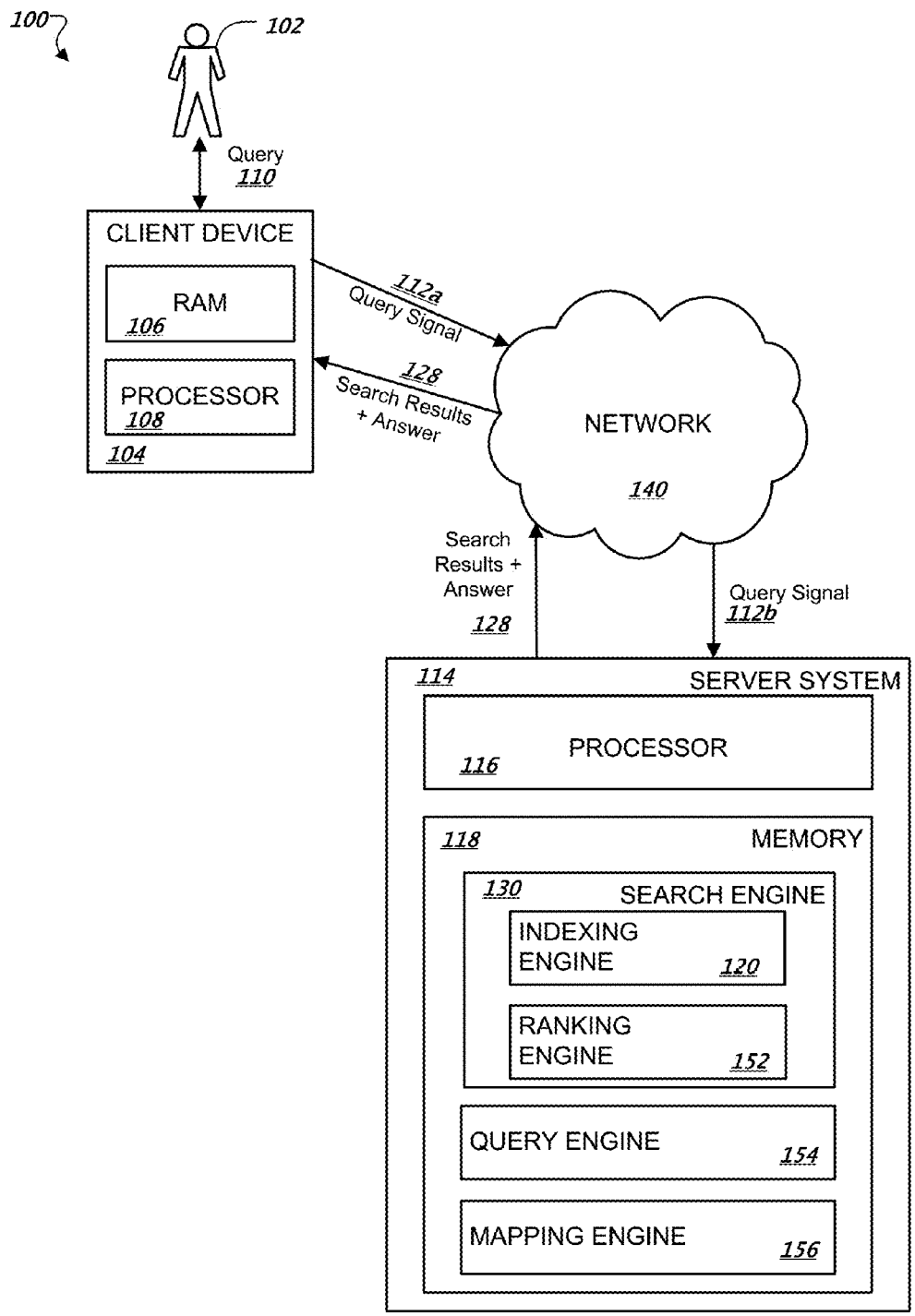
FIG. 1 illustrates an example system for retrieving answers to submitted queries.

Search queries can be directed to particular facts, where a given query seeks a factual answer, e.g., an objective answer. For example, a search query directed to "height of Mount Everest" is a query that seeks to obtain the height of Mount Everest. Search queries can also seek a subjective answer (e.g., what is the best pizza restaurant in Chicago), where the subjective answer can be supported by data, e.g., aggregated ratings provided on websites. Search queries can be associated with particular categories in which factual answers can be classified. Using the example above, the query for "height of Mount Everest" seeks an answer that can be contained in a category relating to measurements of length. Other identifiable categories include dates, person names, phone numbers, geographical points of interest, prices, and other situations where the answers can easily be recognized (e.g., objective answers, answers supported by existing data). Such categories can also include sub-categories e.g., "all dates before 1900." In matching queries to answers, a search engine can use these categories to ensure that the queries are accurately matched with answers relating to a proper category. For example, using these categories, a query "height of Mount Everest" can be matched with answers belonging to a measurements category, and not to answers belonging to an irrelevant category (e.g., phone numbers).

In various implementations, search engine ranking data, for example, the ranking order of web pages containing a particular term, can be used to determine answers corresponding to queries. In particular, answers can be determined based on a mapping of queries to answers. The mapping process can involve identifying possible terms for a given category. For example, the terms "8,850 meters," "8,848 meters," "6 feet 2 inches," and "0 inches" may be identified for category relating to measurements of length. Documents (e.g., web pages) containing the identified terms are also identified. For example, web pages (e.g., news articles, wikis, or blogs may be identified for the term "8,848 meters"). Queries that correspond to the identified documents are also identified. In various implementations, a query is determined to correspond to a particular document if search results for the query rank the document within a certain range (e.g., within the top ten search results). For example, a reference web page containing the terms "8,848 meters" and "8,611 meters" in connection with Mount Everest and K2 mountain, respectively, may appear in the top ten search results for a number of queries directed to Mount Everest and queries directed to K2 mountain (e.g., "how tall is mount everest" or "how tall is K2 mountain"). In this example, the queries "how tall is mount everest" and "how tall is K2 mountain" can both correspond to the reference web page. In some implementations, identified queries can be filtered depending on whether the queries are seeking answers within a particular category. In some implementations, categories can be identified by sending a query to a categorization system that returns one or more categories for the query. In some other implementations, a pre-computed collection of categories associated with particular forms of queries (e.g., expected categories for particular queries). The query can be compared with the collection of categories to identify categories associated with a particular form of query. For example, keywords or phrases in a query can be compared with keywords associated with particular categories. Using the queries "mount everest height," "how tall is mount everest," and "mount everest" as examples, the query "mount everest" can be filtered out of the list of identified queries because, unlike the other two queries, it is less likely to specifically seek an answer relating to measurements.

Terms can be mapped to queries using the identified correspondence between terms and documents and the identified correspondence between documents to queries. Further to the example above, the terms "8,848 meters" and "8,611 meters" can both be mapped to the query "how tall is mount everest" since both terms were contained in the reference web page corresponding to this query. The mapping of terms to queries can be inverted to produce a mapping of queries to terms, where each query is mapped to one or more terms. The inversion of mapped terms to queries can involve creating a mapping of each query in the list of mapped terms to queries to one or more terms that are associated with that query. For example, a mapping of terms to queries may include the terms "8,848 meters" and "8,611 meters" to query "how tall is mount everest." According to this example, an inversion of this mapping can map query "how tall is mount everest" to terms "8,848 meters" and "8,611 meters." In particular, the mapping of queries to terms can allow lookup of terms that correspond to a query by using the query as a starting point. This mapping of queries to terms can be used to determine an answer that corresponds to the query. In some implementations, an answer for a query can be determined by identifying the mapped term that appears most often in the documents associated with that query. For example, in the list of documents that correspond to the query "how tall is mount everest," the term that appears most often can be mapped as the answer corresponding to the query. Further to this example, in a case where the documents associated with "how tall is mount everest" contain more references to "8,848 meters" than "8,611 meters," the term "8,848 meters" will be mapped as the answer to the query "how tall is mount everest." According to this example, a query for "how tall is mount everest" would return the answer "8,848 meters."

FIG. 1 illustrates an example system 100 for retrieving answers to submitted queries. The system 100 is an example of an information retrieval system in which the systems, components, and techniques described below can be implemented. Although several components are illustrated, there may be fewer or more components in the system 100. Moreover, the components can be distributed on one or more computing devices connected by one or more networks or other suitable communication mediums.

A user 102 can interact with the system 100 through a client device 104 (or "client") or other device. For example, the client device 104 can be a computer terminal within a local area network (LAN) or wide area network (WAN). The client device 104 can include a random access memory (RAM) 106 (or other memory and/or a storage device) and a processor 108. The processor 108 is structured to process instructions within the system 104. In some implementations, the processor 108 is a single-threaded processor. In other implementations, the processor 108 is a multi-threaded processor. The processor 108 can include multiple processing cores and is structured to process instructions stored in the RAM 106 (or other memory and/or a storage device included with the client device 104) to display graphical information for a user interface.

A user 102 can connect to a search engine 130 within a server system 114 to submit a query 110. When the user 102 submits a query 110 through an input device attached to a client device 104, a client-side query signal 112a is sent into a network 140 and is forwarded to the server system 114 as a server-side query signal 112b. Server system 114 can be one or more server devices in one or more locations. A server device 114 includes a memory device 118, which can include the search engine 130 loaded therein. A processor 116 is structured to process instructions within the system 114. These instructions can implement one or more components of the search engine 130. The processor 116 can be a single-threaded processor or a multi-threaded processor, and can include multiple processing cores. The processor 116 can process instructions stored in the memory 118 related to the search engine 130 and can send information to the client device 104, through the network 140, to create a graphical presentation in a user interface of the client device 104 (e.g., a search results web page displayed in a web browser).

The search engine 130 identifies resources that match a query 110. The search engine 130 can include an indexing engine 120 that indexes documents (e.g., web pages, images, or news articles found on the Internet) found in a corpus (e.g., a collection or repository of content, for example, the world wide web). The indexing engine 120 can be used to identify documents containing terms relating to a particular category. The search engine 130 can also include a ranking engine 152 to rank documents related to the user query 100. The ranking engine 152 can also rank documents that contain terms relating to a particular category based on relevance. The ranking of the documents can be performed using techniques for determining an information retrieval (IR) score for indexed documents in view of a given query or term. The relevance of a particular document with respect to a particular search term, answer term, or to other provided information may be determined by any appropriate technique. For example, a document may be deemed relevant if the document is ranked highly in the search results for a particular search term, or if the document contains many references to a particular term. In addition, the search engine 130 can include a query engine 154 that is capable of identifying queries that correspond to documents containing a particular term. The search engine 130 can also include a mapping engine 156 that can be used to map queries to terms.

Figure 2:
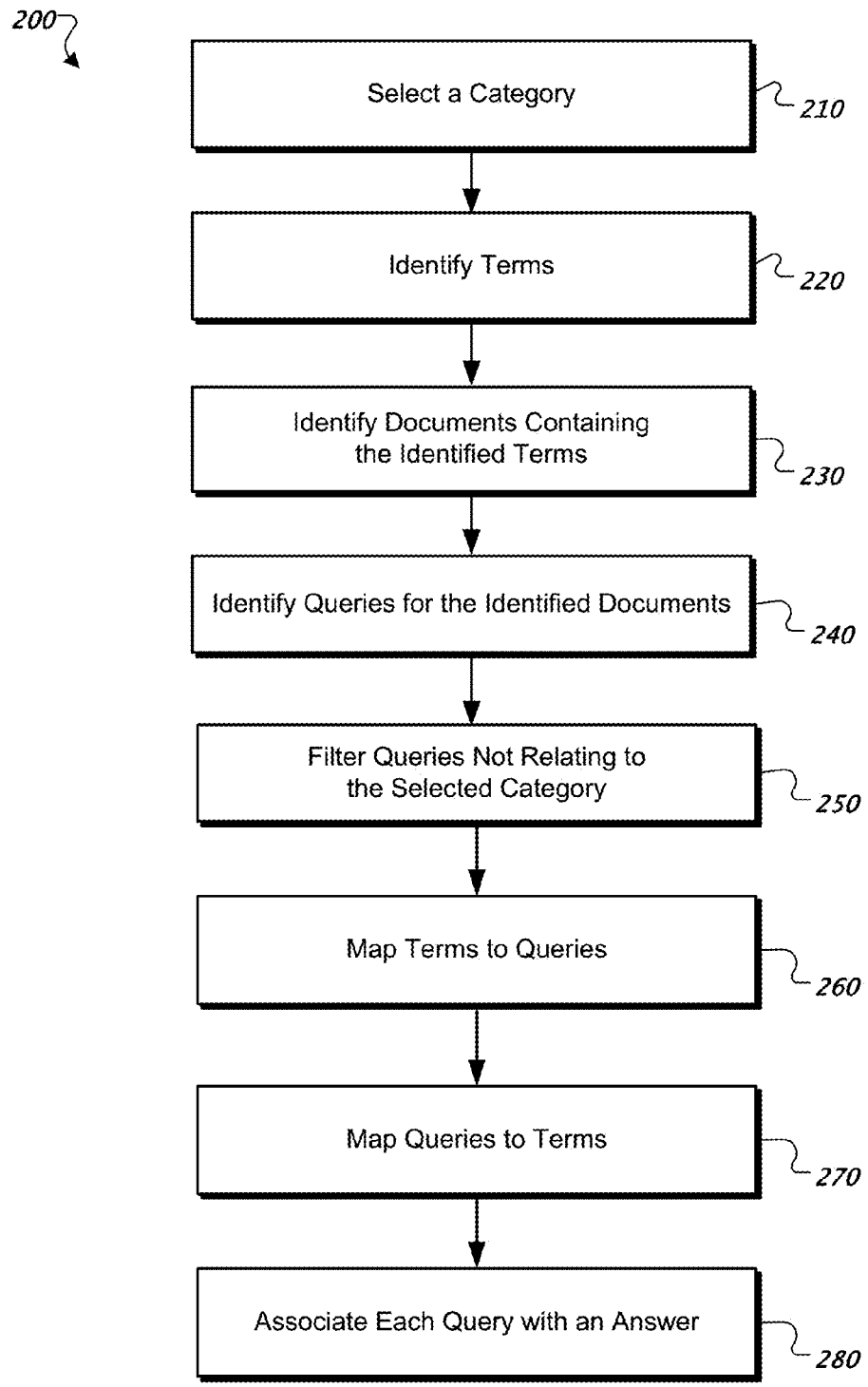
FIG. 2 is a flowchart for an example process for mapping queries to answers.

FIG. 2 is a flowchart for an example process for mapping queries to answers. The process 200 can be performed by a computer system of one or more computers. The system selects a category (step 210). Selection of a category can be used to facilitate the mapping processing. The system identifies terms relating to the selected category (step 220). Terms can be identified in various documents (e.g., web pages, images, or news articles found on the Internet) found in a collection of documents. For example, web page information obtained by a web crawler can be annotated in advance to identify and store terms belonging to various categories. This information can later be retrieved to identify terms contained within the web page that match a selected category. The identification of terms can depend on the type of category that is selected. For example, dates and measurements can be recognized using pattern recognition techniques (e.g., "8,848 meters" can be matched using a pattern "[NUMBER] [UNIT]" while dates can be matched using a "[MONTH] [DAY] [YEAR]" pattern). Further, names of persons can be identified using a database of common first and last names. Geographic locations can be identified by annotating instances of a particular text (e.g., "New York City"), where those instances can be disambiguated based on context surrounding the text. In particular, identified terms can be filtered to eliminate terms that appear infrequently in the collection of documents. For example, instances of terms that do not satisfy a specified threshold (e.g., appearing on fewer than 10 web pages) can be eliminated. A different threshold may be specified depending on the type on the category type. For example, terms relating to length may have a higher threshold than terms relating to phone numbers. In addition, terms that appear too frequently in the collection of documents (e.g., "5 feet") can also be eliminated from the set of identified terms.

The system identifies documents containing the identified terms (step 230). For example, web pages (e.g., wikis or blogs may be identified for the term "8,848 meters"). In particular, the search engine can use existing indices for a given corpus to identify and isolate such documents.

The system identifies queries corresponding to the identified documents (step 240). In various implementations, search engine ranking information can be used to identify queries corresponding to documents. For example, identification of queries can be accomplished by scanning search engine query logs and determining correspondences between queries and documents. A correspondence between a query and a document can be determined if search results for the query rank the document within a certain range (e.g., within the top ten search results). For example, a wiki web page that appears as the top search result for the query "how tall is mount everest" would be identified as a document corresponding to this query. In some implementations, correspondence between a query and a document can be determined based on a document exceeding a threshold percentage of total clicks in search results for that query. For example, assuming a query referencing documents A, B, and C in its search results, where documents A, B, and C receive X percent, Y percent, and Z percent of the total clicks for the search results, respectively. In this example, a threshold of W percent of total clicks, where W is greater than X and Y, would result in the query corresponding to documents A and B. In some implementations, the process for mapping queries to answers can be performed as an "online" process, where answers occurring in search results in response to a user submitted query are used to determine correspondences between queries and documents.

In various implementations, the system can filter the identified queries based on whether the queries are seeking answers relating to the selected category (step 250). For example, for a category relating to measurements, the system may filter out a query for "mount everest" because the query does not specifically seek a measurement-based answer.

The system maps terms to queries (step 260). The mapping of terms to queries can be accomplished using the previously established correspondence between terms to documents (step 230) and the previously established correspondence between documents to queries (step 240). In this regard, each term can be associated with a number of different queries. For example, the term "8,848 meters" may be associated with the queries "how tall is mount everest", "height of mount everest," and "mount everest elevation." In contrast to the previous example, the term "8,611 meters" may be associated with the queries "how tall is mount everest," "height of mount everest," and "how tall is K2 mountain." In this example, the term "8,611 meters," which is the height of K2 and not Mount Everest, may still be mapped to the queries "how tall is mount everest" and "height of mount everest" because these queries may reference documents that contain the heights of both K2 and Mount Everest.

In some implementations, a term can be mapped to a query based on a threshold number of documents containing that term and identified in the search results for that query. In some other implementations, a term can be mapped to a query based on a threshold number of documents containing that term where the documents are ranked within a certain range (e.g., within the top ten search results) in the search results for that query. For example, the top ten search results for a query "how tall is mount everest" may contain 9 documents that contain the term "8,848 meters" while the top ten search results for a query "tallest mountains in the world" may contain only 2 documents that contain "8,848 meters." In this example, assuming a threshold of 5 documents, the query "how tall is mount everest" is mapped to the term "8,848 meters," because search results for the query "how tall is mount everest" include 9 documents within the top ten search results that contain the term "8,848 meters," whereas the query "tallest mountains in the world" is not mapped to the term "8,848 meters," because search results for the query "tallest mountains in the world" include 2 documents within the top ten search results that contain the term "8,848 meters."

In some other implementations, a term can be mapped to a query based on a percentage of total clicks received for documents referenced in the search results for that query that contain that term. For example, the term "8,848 meters" may appear in a first number of documents in search results for a query "how tall is mount everest," where this first number of documents receive 70 to 90 percent of the total clicks. In comparison, the term "8,848 meters" may appear in a second number of documents in search results for a query "elevation of mount everest base camp," where this second number of documents receive 15 to 30 percent of the total clicks. In this example, the query "how tall is mount everest" can be determined to be a more relevant mapping to the term "8,848 meters" than the query "elevation of mount everest base camp."

In yet some other implementations, the mapping of terms to queries can be accomplished by scanning query logs and determining a count a particular term occurs in documents that correspond to a particular query. For example, the term "Feb. 6, 2011" may be referenced in nine out of the top ten documents indexed by a search engine that has crawled a web corpus, for a query "when was the super bowl in 2011." In contrast, the term "Feb. 6, 2011" may occur in only two out of the top ten documents for a query directed to "super bowl." In this example, the term "Feb. 6, 2011" can be deemed a better match for the query "when was the super bowl in 2011" instead of "super bowl." In some other implementations, query logs from a single span of time can be scanned to determine a count a term occurs in documents. In some alternative implementations, information from query logs spanning different time periods can be averaged to determine a count a term occurs in documents to account for document rankings may change over a span of time. In yet some other implementations, the distribution of scores assigned to queries by a scoring function can be used to map terms to queries. For example, a candidate answer A may correspond to queries Q1 and Q2. In such instances, if the scores for Q1 are much lower than the scores for Q2, then the answer A can be mapped to Q2.

The system maps queries to terms (step 270). The mapping of queries to terms can be established using the mapping of terms to queries, as determined in step 260. In particular, this mapping can be accomplished by inverting the mapping of terms to queries. As a result, each query can be mapped to one or more terms. Further to the examples used in the previous step, the queries "how tall is mount everest" and "height of mount everest" are mapped to terms "8,848 meters" and "8,611 meters," with the query "mount everest elevation" being mapped to "8,848 meters," and with the query "how tall is K2 mountain" being mapped to "8,611 meters."

The system associates each query with an answer (step 280). The system can associate a query with an answer using the mapping of queries to terms, as established in step 270. In some implementations, search engine ranking information can be used to determine a count mapped terms appear within documents associated with a query, such that an answer for a query can be determined by identifying the mapped term that appears most often in the associated documents. For example, for the query "how tall is mount everest," the term "8,848 meters" may appear more often than the term "8,611 meters," thereby indicating that this query should be mapped to "8,848 meters." In other implementations, a term that is referenced in documents that rank highly in search results for a given query may be the term that is associated with that query. In some alternative implementations, answers can be identified by assigning weights to documents based on document ranking for a given query. For example, an answer appearing in the top 3 search results for a query can be assigned a greater weight than an answer that appears in the bottom 3 search results for that same query. In some other implementations, scores assigned to answers by a scoring function can be used to identify answers for queries. For example, given a query that has three possible answers A, B, and C with scores of X, Y, and Z, respectively, where X is larger than both Y and Z, then A can be identified as the answer for that query. In some alternative implementations, no answers may be identified in instances where a deviation between a first answer score and a second answer score exceeds a threshold value.

Figure 3:
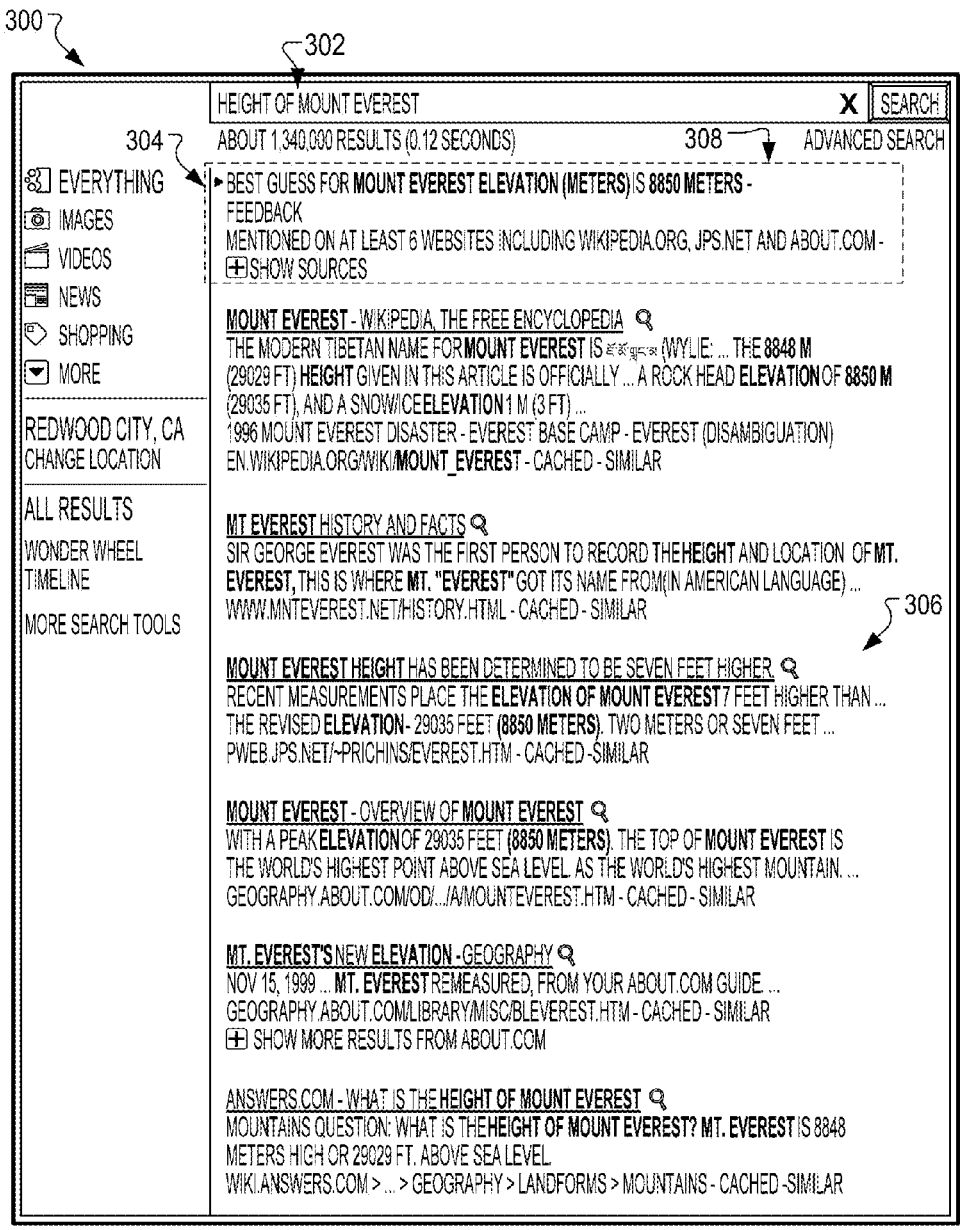
FIG. 3 illustrates example results for a query.

In yet some other implementations, the mapping of queries to answers can be performed in combination with other methods, for example, identifying answers based on information extracted from question answering documents (e.g., documents containing questions and their corresponding answers) or from documents formatted in a tabular format (e.g., charts that organize answers by categories). In some alternative implementations, the mapping of answers to queries can be used to facilitate query revisions. For example, using an answer to query mapping, queries having common answers can be clustered and analyzed. In such instances, differently formulated queries seeking the same or overlapping answer (e.g., "X alma mater" and "what high school did X go to") can be revised to improve the question answering coverage. FIG. 3 illustrates example results for a query. In particular, FIG. 3 illustrates an example user interface 300 for presenting results of a query. As shown in the example user interface 300, search results 306 can be presented in response to the query "height of mount everest" 302. The search results 306 identify documents responsive to the query. An answer section 304 positioned above the search results 306 displays the answer 308 ("8850 meters") responsive to the query. In various implementations, the answer portion 304 also displays sources used to determine the answer, thereby allowing a user an opportunity to verify the answer. In some implementations, a "show sources" option is included in the answer portion 304, and may be selected to display references (e.g., links) to one or more sources used to identify the answer. In some other implementations, answers can be presented in connection with unrelated queries that do not explicitly request a specific answer. For example, customer service numbers of a corporation X (e.g., numbers that correspond to queries, for example, "X customer service" or "X phone number") can be presented, for example, in connection with a query for "X."

Figure 4:
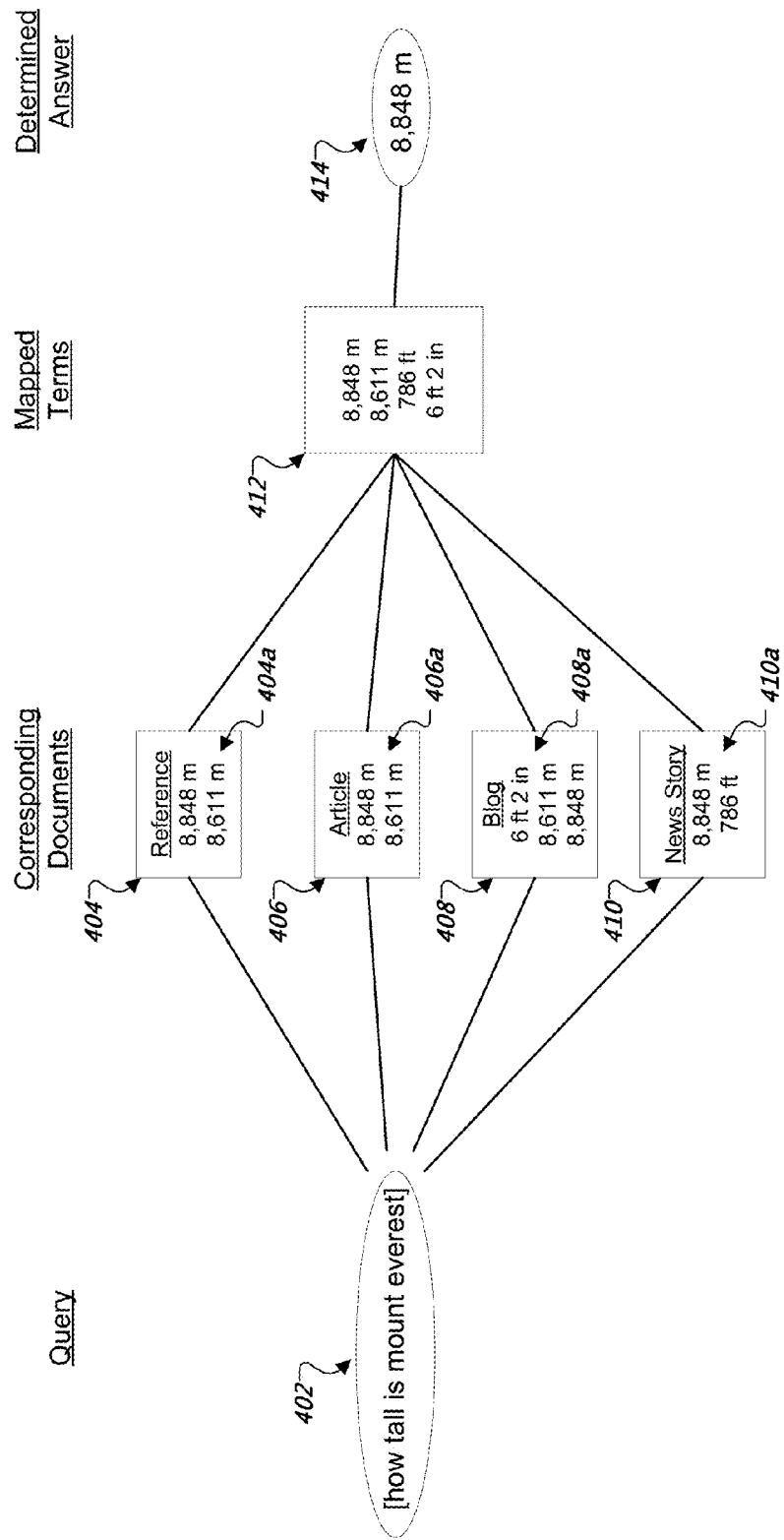
FIG. 4 illustrates an example mapping of a query to an answer.

FIG. 4 illustrates an example mapping of a query to an answer. In more detail, FIG. 4 illustrates an example mapping for the query 402 ("how tall is mount everest") that can be determined using the steps described in connection with FIG. 2. In particular, with respect to steps 210 to 230, documents 404 to 410 containing identified terms 404a to 410a can be identified. A correspondence between query 402 to documents 404 to 410 can be made using search engine ranking information, as described in step 240. The query 402 can be mapped to terms 412 that were contained in corresponding documents 404 to 410, as discussed in more detail in steps 260 and 270. Further, the query 402 can be associated with an answer that is determined to correspond to that query, as discussed in more detail in step 270. As a result, the query 402 is associated with the answer 414.

Figure 5:
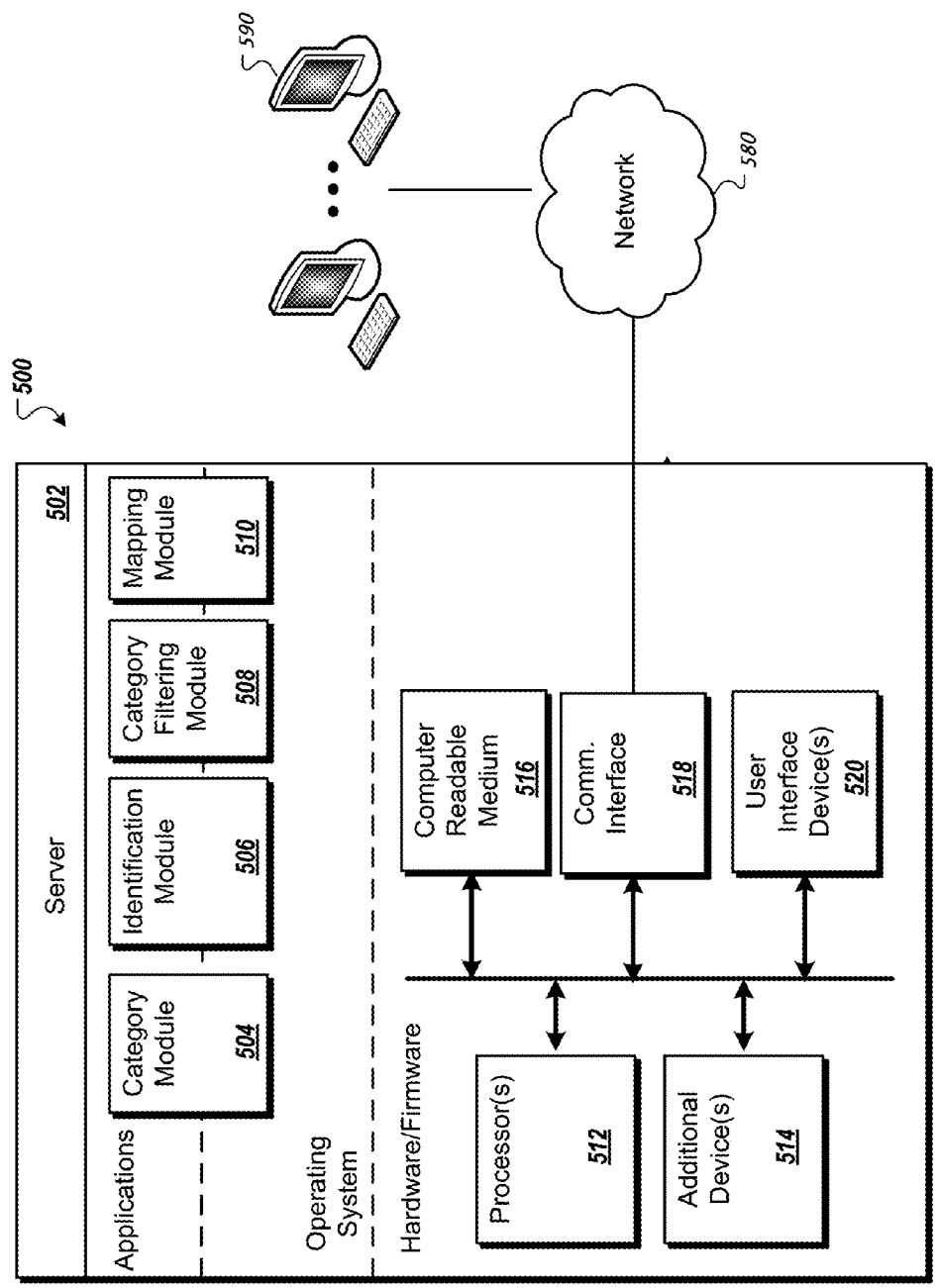
FIG. 5 is a schematic diagram of an example server.

FIG. 5 is a schematic diagram of an example server 502. The server 502 is optionally connected to one or more user or client computers 590 through a network 580. The server 502 consists of one or more data processing apparatuses. While only one data processing apparatus is shown in FIG. 5, multiple data processing apparatus can be used. The server 502 includes various software modules, e.g. executable software programs or libraries, including one or more of: a category module 504, an identification module 506, a category filtering module 508, and a mapping module 510. In particular, the category module 504 can be used to select categories for performing the mapping process. The identification module 506 can be used to identify terms relating to a particular answer, to identify documents containing identified terms, and to identify queries corresponding to identified documents. The category filtering module 508 can be used to filter queries that do not relate to a selected category. The mapping module 510 can be used to map terms to queries and also to map queries to terms. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device, e.g., one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    for each of a plurality of categories and for a collection of documents, wherein each category is associated with one or more respective text patterns and one or more keywords or phrases specific to the category:
        applying the text patterns specific to the category to the collection of documents to identify a plurality of fact terms in the documents, each fact term being a segment of text that matches one of the text patterns specific to the category one or more times in the documents of the collection;
        creating and storing in a computer readable memory a plurality of first associations, each first association associating a respective fact term of the plurality of fact terms to a respective plurality of documents that each contain the respective fact term;
        creating and storing in a computer readable memory a plurality of second associations between documents and previously-submitted queries, each document being one of the associated documents in the first associations, each previously-submitted query including a keyword or phrase specific to the category, each second association associating a respective document from the first associations to the one or more previously-submitted queries that had a search result that referenced the respective document; and
        generating from the first associations and the second associations and storing in a computer readable memory a plurality of mappings, each of the mappings associating a query with a single fact term, wherein the query and the fact term are both associated with at least a threshold number of the same documents by the second and first associations respectively.

2. The method of claim 1, wherein, for each of the plurality of categories, the plurality of fact terms comprises fact terms that occur in more than a threshold number of documents in the collection of documents.

3. The method of claim 1, wherein associating a respective document to the one or more previously-submitted queries comprises:

determining that the respective document is referenced by a highly ranked search result for each of the one or more previously-submitted queries.

4. The method of claim 1, wherein associating a respective document to the one or more previously-submitted queries comprises:
    determining that a percentage of clicks of the search result that referenced the respective document exceeds a threshold percentage of total clicks of search results for each of the one or more previously-submitted queries.

5. The method of claim 1, wherein:
    the plurality of categories comprise a category of measurements, a category of dates, and a category of names of persons.

6. The method of claim 1, further comprising:
    receiving a user query;
    identifying in the mappings a first mapping that associates the user query with a first fact term; and
    providing the first fact term in a response to the user query.

7. A system comprising:
    a storage medium having instructions stored thereon; and
    data processing apparatus operable to execute the instructions to perform operations comprising:
        for each of a plurality of categories and for a collection of documents, wherein each category is associated with one or more respective text patterns and one or more keywords or phrases specific to the category:
            applying the text patterns specific to the category to the collection of documents to identify a plurality of fact terms in the documents, each fact term being a segment of text that matches one of the text patterns specific to the category one or more times in the documents of the collection;
            creating and storing in a computer readable memory a plurality of first associations, each first association associating a respective fact term of the plurality of fact terms to a respective plurality of documents that each contain the respective fact term;
            creating and storing in a computer readable memory a plurality of second associations between documents and previously-submitted queries, each document being one of the associated documents in the first associations, each previously-submitted query including a keyword or phrase specific to the category, each second association associating a respective document from the first associations to the one or more previously-submitted queries that had a search result that referenced the respective document; and
            generating from the first associations and the second associations and storing in a computer readable memory a plurality of mappings, each of the mappings associating a query with a single fact term, wherein the query and the fact term are both associated with at least a threshold number of the same documents by the second and first associations respectively.

8. The system of claim 7, wherein, for each of the plurality of categories, the plurality of fact terms comprises fact terms that occur in more than a threshold number of documents in the collection of documents.

9. The system of claim 7, wherein associating a respective document to the one or more previously-submitted queries comprises:
    determining that the respective document is referenced by a highly ranked search result for each of the one or more previously-submitted queries.

10. The system of claim 7, wherein associating a respective document to the one or more previously-submitted queries comprises:
    determining that a percentage of clicks of the search result that referenced the respective document exceeds a threshold percentage of total clicks of search results for each of the one or more previously-submitted queries.

11. The system of claim 7, wherein:
    the plurality of categories comprise a category of measurements, a category of dates, and a category of names of persons.

12. The system of claim 7, wherein the operations further comprise:
    receiving a user query;
    identifying in the mappings a first mapping that associates the user query with a first fact term; and
    providing the first fact term in a response to the user query.

13. A computer storage medium having instructions stored thereon which, when executed by a data processing apparatus, cause the data processing apparatus to perform operations comprising:
    for each of a plurality of categories and for a collection of documents, wherein each category is associated with one or more respective text patterns and one or more keywords or phrases specific to the category:
        applying the text patterns specific to the category to the collection of documents to identify a plurality of fact terms in the documents, each fact term being a segment of text that matches one of the text patterns specific to the category one or more times in the documents of the collection;
        creating and storing in a computer readable memory a plurality of first associations, each first association associating a respective fact term of the plurality of fact terms to a respective plurality of documents that each contain the respective fact term;
        creating and storing in a computer readable memory a plurality of second associations between documents and previously-submitted queries, each document being one of the associated documents in the first associations, each previously-submitted query including a keyword or phrase associated with the category, each second association associating a respective document from the first associations to the one or more previously-submitted queries that had a search result that referenced the respective document; and
        generating from the first associations and the second associations and storing in a computer readable memory a plurality of mappings, each of the mappings associating a query with a single fact term, wherein the query and the fact term are both associated with at least a threshold number of the same documents by the second and first associations respectively.

14. The computer storage medium of claim 13, wherein, for each of the plurality of categories, the plurality of fact terms comprises fact terms that occur in more than a threshold number of documents in the collection of documents.

15. The computer storage medium of claim 13, wherein associating a respective document to the one or more previously-submitted queries comprises:
    determining that the respective document is referenced by a highly ranked search result for each of the one or more previously-submitted queries.

16. The computer storage medium of claim 13, wherein associating a respective document to the one or more previously-submitted queries comprises:
    determining that a percentage of clicks of the search result that referenced the respective document exceeds a threshold percentage of total clicks of search results for each of the one or more previously-submitted queries.

17. The computer storage medium of claim 13, wherein:
the plurality of categories comprise a category of measurements, a category of dates, and a category of names of persons.

18. The computer storage medium of claim 13, wherein the operations further comprise:
    receiving a user query;
    identifying in the mappings a first mapping that associates the user query with a first fact term; and
    providing the first fact term in a response to the user query.

\* \* \* \* \*